United States Patent [19]

Hiramatsu et al.

[11] Patent Number: 4,829,371
[45] Date of Patent: May 9, 1989

[54] FILM READING APPARATUS WHICH READS AN UNEXPOSED PORTION OF A FILM TO DETERMINE ITS TYPE

[75] Inventors: Akira Hiramatsu, Yokohama; Takashi Kawabata, Kamakura; Hitoshi Mukohjima, Yokohama; Koichi Washisu, Tokyo, all of Japan

[73] Assignee: Canon Kabushiki Kaisha, Tokyo, Japan

[21] Appl. No.: 841,625

[22] Filed: Mar. 20, 1986

[30] Foreign Application Priority Data

Mar. 23, 1985 [JP] Japan .................................. 60-59031
Jul. 8, 1985 [JP] Japan ................................ 60-149482

[51] Int. Cl.[4] ........................ G03F 3/08; G03B 27/80; H04N 1/46
[52] U.S. Cl. ........................................ 358/80; 358/75; 358/76; 355/38
[58] Field of Search ...................... 355/35, 38; 358/76, 358/75, 80

[56] References Cited

U.S. PATENT DOCUMENTS

| 4,079,388 | 3/1978 | Takahama et al. | 355/38 |
| 4,097,892 | 6/1978 | Balding | 358/76 |
| 4,274,732 | 6/1981 | Thurm et al. | 355/38 |
| 4,448,521 | 5/1984 | Shiota | 355/38 |
| 4,577,961 | 3/1986 | Terashita | 355/38 |
| 4,659,213 | 4/1987 | Matsumoto | 355/38 |
| 4,692,794 | 9/1987 | Suzuki | 355/38 |
| 4,707,120 | 11/1987 | Yamamoto | 355/38 |

FOREIGN PATENT DOCUMENTS

| 2803866 | 8/1978 | Fed. Rep. of Germany | 355/38 |
| 52-30429 | 3/1977 | Japan | 355/35 |
| 1068876 | 1/1984 | U.S.S.R. | 355/38 |
| 2032633 | 5/1980 | United Kingdom | 355/38 |

Primary Examiner—James J. Groody
Assistant Examiner—Randall S. Svihla
Attorney, Agent, or Firm—Fitzpatrick, Cella, Harper & Scinto

[57] ABSTRACT

A color scanner for converting color data of a color original (e.g., a photographic film) into an electrical signal, includes a level comparator for discriminating the type of film (e.g., color negative vs. color positive, color vs. monochrome, type of color negative) in accordance with output signals, e.g., color component signals, from a sensor (i.e., based on a light transmittance of an unexposed portion of the film). The output from the level comparator is supplied to an accumulation time control block through a register, a selector, and the like. The accumulation time control block corrects the electrical signal based on the discrimination result from the level comparator irrespective of the type of film, so that an accumulation time of the sensor is changed by changing a bias voltage applied thereto.

9 Claims, 9 Drawing Sheets

FILM READING APPARATUS WHICH READS AN UNEXPOSED PORTION OF A FILM TO DETERMINE ITS TYPE

BACKGROUND OF THE INVENTION

1. Field of the Invention

The present invention relates to an apparatus for processing image reading data.

2. Related Background Art

A color scanner which separates color data obtained by scanning a color original into R, G, and B components to obtain image data corresponding to these colors, and mixes the image data to reproduce the color original, is already well known. In such a color scanner, color balance is important. Color balance means a balance of densities of three primary color images that are reproduced from three image signals obtained by the color scanner. As is well known, when the color images are imbalanced, tone of the reproduced original image differs considerably from that of the color original.

When a background color in a color original is mixed with a color pattern formed on the color original, e.g., when a film base is orange and the orange is mixed with the color pattern of a negative image, as in a negative color film, the background color of the color original is superimposed on color data obtained by scanning with the color scanner. This causes a serious problem in a light transmitting type scanner, which illuminates a color original with light and detects the light transmitted therethrough with a sensor.

Therefore, when the color image includes the background color of the original, an image signal scanned with the color scanner cannot be reproduced in an appropriate color.

In order to overcome this, as described in Japanese Kokai 59-224861, an operator visually discriminates the type of film of the color original, and makes manual corrections accordingly.

Such an operation is very inconvenient, and an unskilled operator often fails to accurately discriminate the type of film or makes erroneous corrections, and thus, cannot reproduce an image in an appropriate color.

SUMMARY OF THE INVENTION

It is an object of the present invention to provide an image read apparatus free from the above problems.

It is another object of the present invention to provide an image data processing apparatus which enables proper reproduction of a light-transmitting original or film through image reading.

It is still another object of the present invention to provide an image data processing apparatus which enables proper reproduction of a color original.

It is still another object of the present invention to provide an image scanner which can reproduce a film image in accurate color.

It is still another object of the present invention to provide a color scanner which discriminates the type of a presented color original by detecting color data of the original, and which automatically corrects its output in accordance therewith.

It is still another object of the present invention to provide a color scanner which subtracts an electrical signal of background-color data of a color original from an electrical signal obtained by converting color data of the original, in order to output the difference as the color data of the original.

The above and other objects and features of the invention will be apparent from the following detailed description.

DETAILED DESCRIPTION OF THE PREFERRED EMBODIMENTS

Figures 1A, 1B:
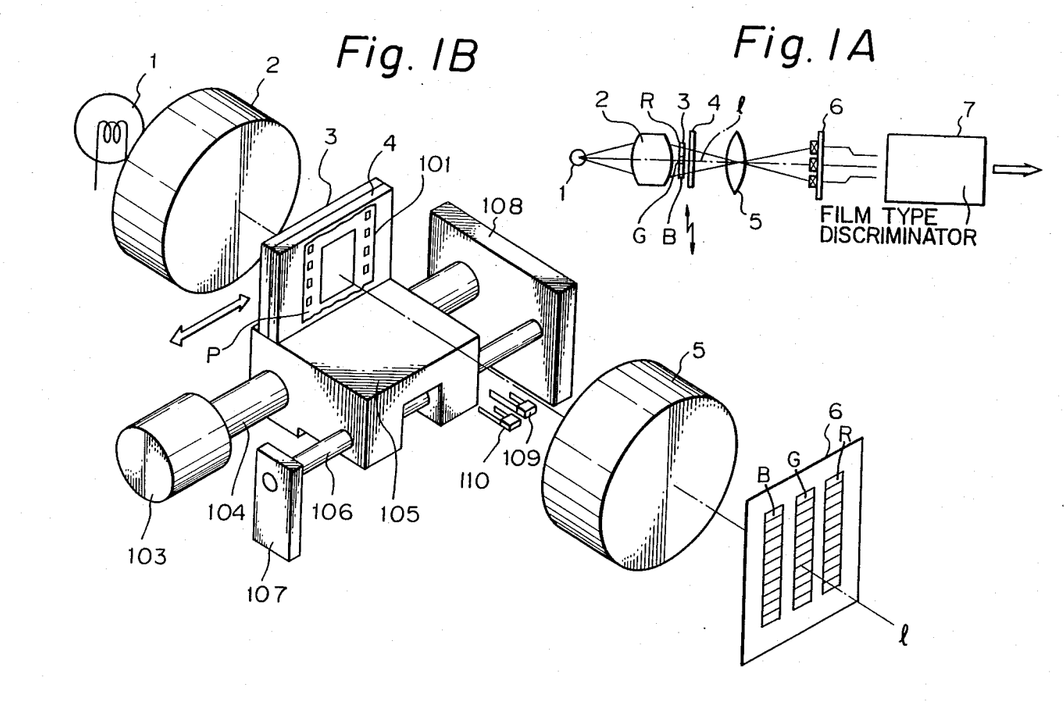
FIG. 1A is a schematic block diagram of a color scanner according to an embodiment of the present invention.
FIG. 1B is a perspective view of the color scanner shown in FIG. 1A.

FIG. 1A is a schematic block diagram of a color scanner according to an embodiment of the present invention. Referring to FIG. 1A a light source 1 illuminates a developed film with white light. A condenser lens 2 focuses the light beam from the light source 1, and constitutes an illumination optical system. A color separation filter 3 separates a light beam from the condenser lens 2 into three colors (R, G, and B). A film holder 4 holds a film as a color original, and can scan it stepwise, in a plane perpendicular to an optical axis 1. A projector lens 5 projects the film original onto a sensor (to be described later), and a self-scanning type sensor 6 (e.g., a CCD) is arranged at the projection position of the three colors separated by the filter 3. The sensor 6, the film held by the film holder 4, and the projector lens 5 are arranged to obtain an optically conjugate relationship (i.e., the image is in focus on the sensor 6 through the lens 5).

The film illuminated by the illumination optical system consisting of the light source 1, the condenser lens 2, and the color separation filter 3 is focused on the sensor 6 by the projector lens 5, and color data of the film can be obtained by sequentially reading out sensor outputs in response to scanning of the film holder 4. A block 7 represent means, such as circuitry described below, which discriminates the type of film, based on the output from the sensor 6, to perform signal processing.

FIG. 1B is a perspective view of a mechanism portion of the film holder scanning system of the color scanner shown in FIG. 1A. Referring to FIG. 1B, the parts having the same functions as those in FIG. 1A are indicated by the same reference numerals and detailed description thereof will be omitted.

A film 101 as a color original is mounted on a holder 4, as shown in FIG. 1B. A feed motor 103 scans a base 105 having the film 101 and the holder 4 through a known feed screw 104 in a direction indicated by the arrows in FIG. 1B. A guide rail 106 holds the base 105, and is supported by supporting portions 107 and 108. Note that 1 indicates the optical axis.

Assume that the film 101 is scanned from right to left in FIG. 1B. When the base 105 is moved to the origin (the right end in FIG. 1B) by the motor 103 prior to the scanning operation for reading an image signal, end switches 109 and 110 are turned on. When the end switches 109 and 110 have been turned on, the film 101 is set so that an unexposed portion P of the film 101 is located at a position at which it is illuminated with the light source 1 through the condenser lens 2 and the color separation filter 3. Therefore, when the switches 109 and 110 are turned on, light transmitted through the unexposed portion P of the film 101 is collimated by the projector lens 5 and is focused on the sensor 6. Note that the end switches 109 and 110 are arranged so that the switch 109 is first turned off and the switch 110 is then turned off during film scanning. The sensor 6 consists of three sensor portions corresponding to the three separated colors (R, G, and B) by the filter 3.

The film scanned with the scanner of this embodiment will be explained with reference to FIG. 2.

Figure 2:
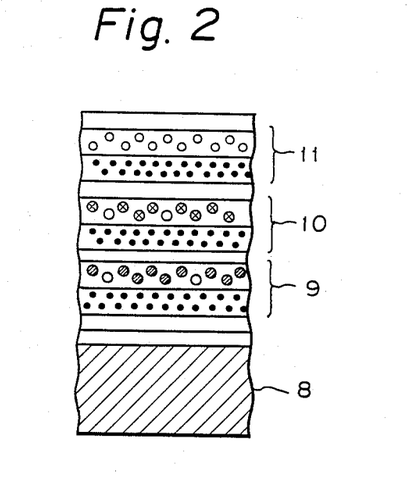
FIG. 2 is an illustration of a normal negative color film after development.

FIG. 2 shows a structure of a normal negative color film after development, which has a film base 8. A negative image is formed by a cyan negative image 9, a magenta negative image 10, and an yellow negative image 11.

Figure 3:
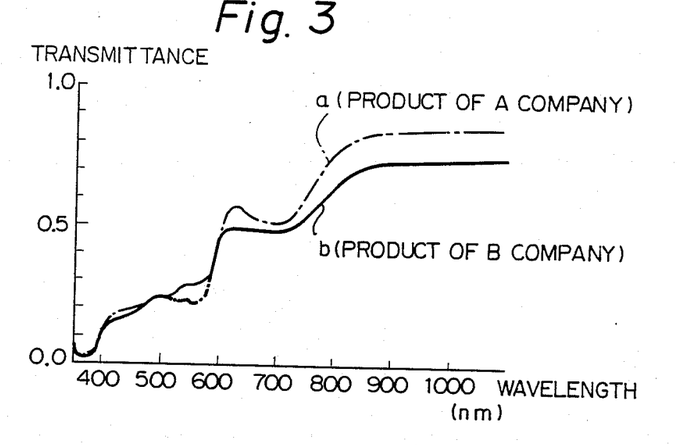
FIG. 3 is a graph showing spectral transmittance of an unexposed portion of the developed film shown in FIG. 2.
Figure 4:
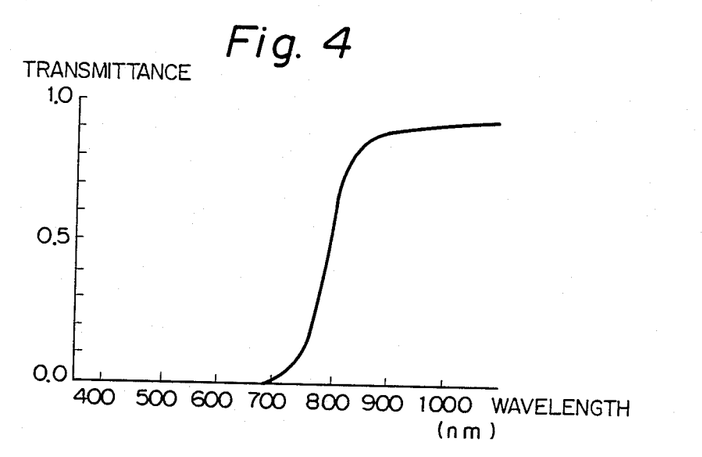
FIG. 4 is a graph showing spectral transmittance of an unexposed portion of a developed positive film.

FIG. 3 is a graph showing spectral transmittance of the unexposed portion, i.e., a portion near the perforations, of the developed negative color film, and FIG. 4 is a graph showing that of a developed positive color film.

As can be seen from these graphs, it was experimentally confirmed that almost no light is transmitted through the unexposed portion of the developed positive color film below a wavelength of 720 nm in the visible range, and that the unexposed portion of the negative color film has spectral transmittance as shown in FIG. 3. Due to this property, when the negative color film is irradiated with light, it is orange in color. Therefore, the spectral transmittance of the unexposed portions of the positive and negative color films are quite different from each other. It was also demonstrated that in the negative color film, the transmittances of film bases differ depending on their manufacturers (curves a and b in FIG. 3 correspond to films available from film manufacturers A and B).

More specifically, almost no light is transmitted through the positive color film in the visible range. In the negative color film, when examining light components near wavelengths of 440 nm (i.e., blue), 530 nm (i.e., green), and 600 nm (i.e., red), the transmittance of a blue light component is lower than those of green and red light components. This is shown in FIG. 3, in which the film a transmits a smaller amount of light near a wavelength of 530 nm (i.e., green), and a larger amount of red light, than does the film b.

Figure 5:
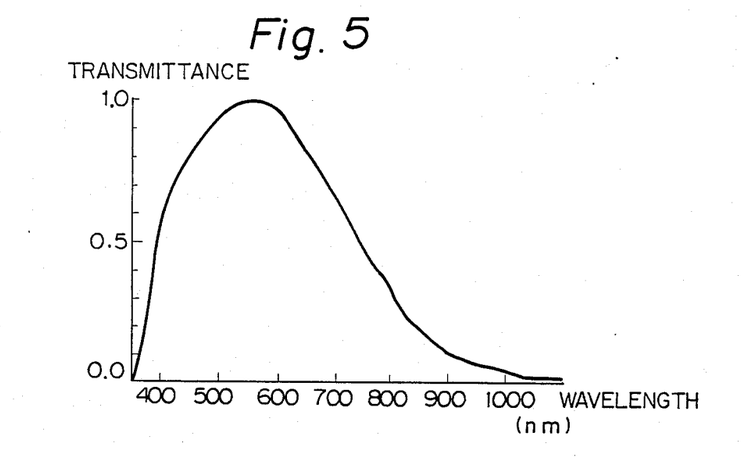
FIG. 5 is a graph showing a spectral sensitivity of a sensor.
Figure 6:
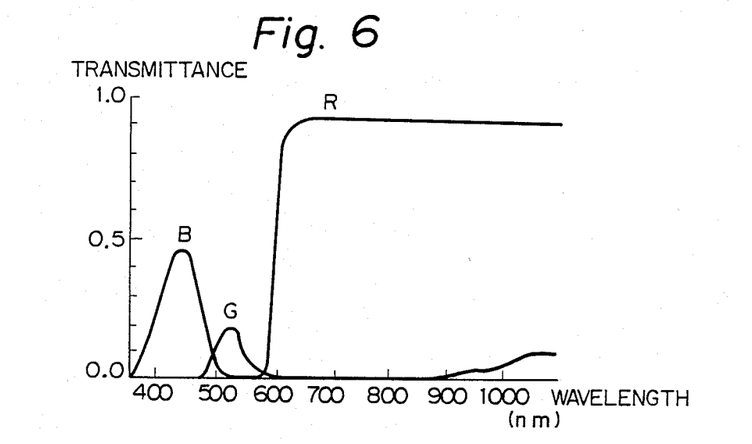
FIG. 6 is a graph showing spectral transmittance of a three-color separation filter.

FIG. 5 is a graph showing the spectral sensitivity of the sensor 6, and FIG. 6 is a graph showing those of R, G and B filters of the color separation filter 3.

R, G, and B sensors mainly detect light components having wavelengths of 600 nm, 530 nm, and 440 nm through the R, G, and B filters, respectively.

From the above data, the spectral transmittance indicating background-color data of a color original appearing in an unexposed portion (e.g., a portion outside the perforations) of a developed film as the color original varies widely depending on the type of film. Therefore, if the spectral transmittance of the film is observed by a sensor through R, G, and B filters, the type of film can be automatically discriminated.

The block 7 which automatically discriminates the type of film by using differences in the spectral transmittances of developed films will be explained with reference to FIG. 7.

Figure 7:
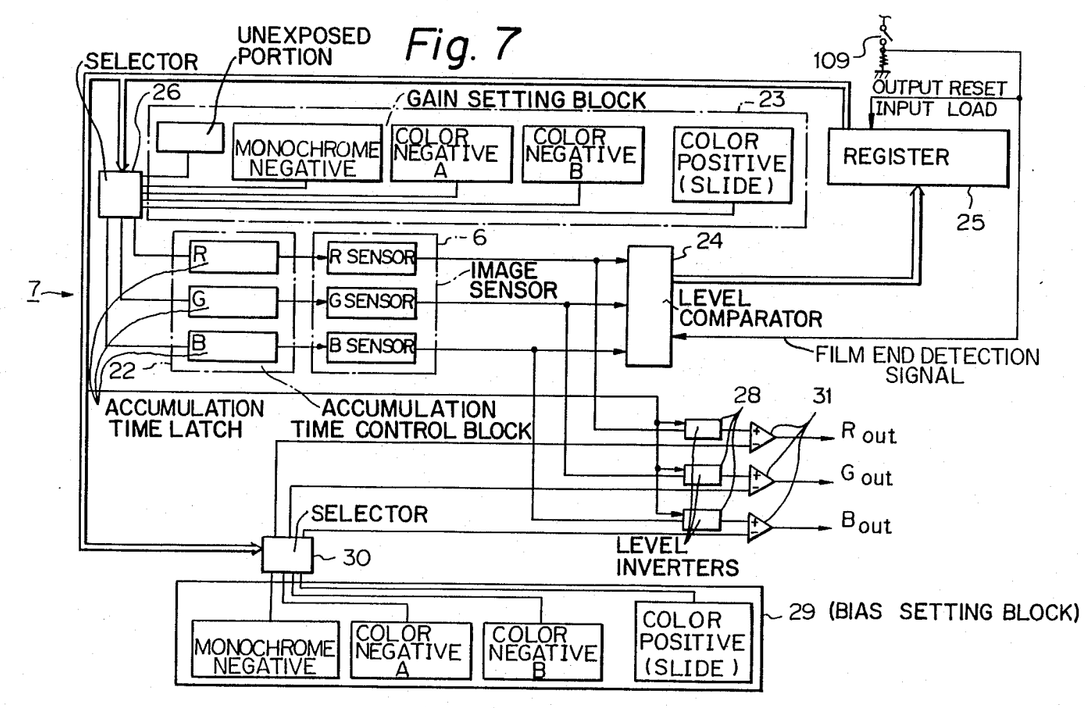
FIG. 7 is a detailed circuit diagram of block 7 shown in FIG. 1A.

Referring to FIG. 7, an accumulation time control block 22 controls an accumulation time of the sensor 6, shown in FIGS. 1A and 1B, in accordance with an output from a gain setting block 23. The gain setting block 23 transfers accumulation time data for detecting the spectral transmittance near the unexposed portion, e.g., the perforated portion of the film, accumulation time data for a negative color film, accumulation time data for a positive color film, or accumulation time data for a monochrome film, to the block 22 in accordance with a discrimination result from a level comparator 24 (to be described below).

The level comparator 24 discriminates the type of film in accordance with R, G, and B outputs from the sensor 6 shown in FIG. 1A (or 1B).

Figure 8:
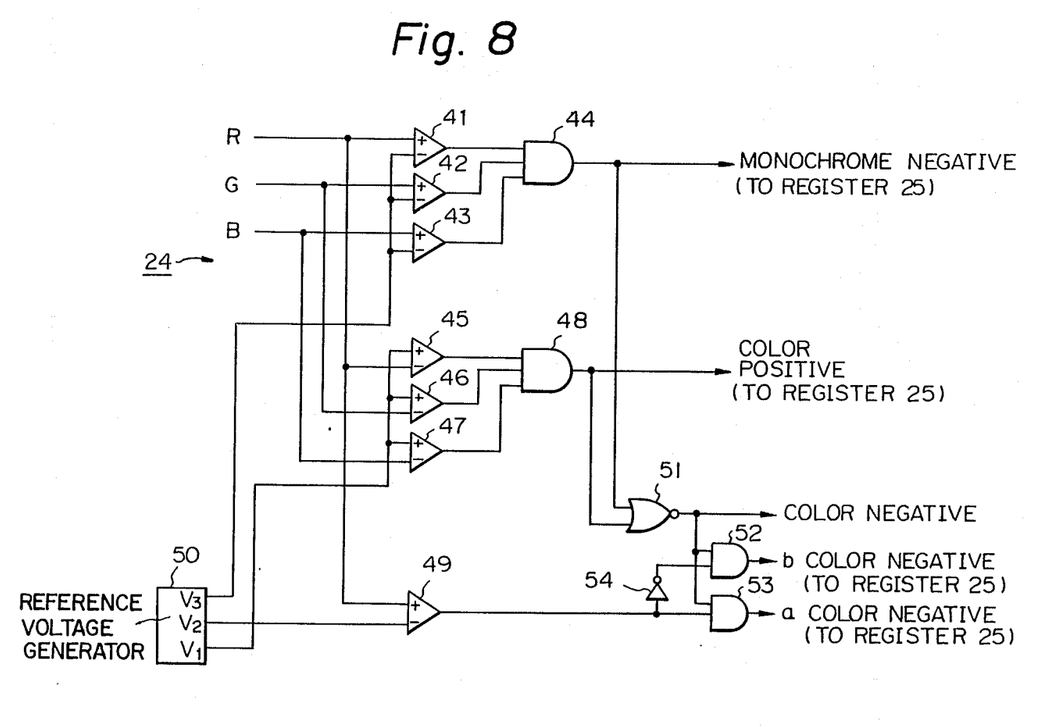
FIG. 8 is a detailed circuit diagram of level comparator 24 shown in FIG. 7.

An arrangement of the level comparator 24 will now be described with reference to FIG. 8. Referring to FIG. 8, the level comparator 24 comprises comparators 41 to 43, 45 to 47, and 49, AND gates 44, 48, 52, and 53, and a reference voltage generator 50. The reference voltage generator 50 generates an output $V_3$ for discriminating a negative monochrome film, an output $V_2$ for discriminating a negative color film and the manufacturer thereof, and an output $V_1$ for discriminating a positive color film ($V_3 > V_2 > V_1$)

In the level comparator 24 with the above arrangement, when all the R, G, and B outputs detected by the sensor 6 shown in FIGS. 1A or 1B are higher than the output $V_3$ from the generator 50, the output from the AND gate 44 goes to H level to discriminate that the film of interest is a negative monochrome film. When all R, G, and B outputs from the sensor 6 are lower than the output $V_1$ from the generator 50, the output from the AND gate 48 goes to H level to discriminate that the film of interest is a positive color film. Otherwise, it is discriminated that the film of interest is a negative color film. Furthermore, the manufacturer of the film is discriminated from whether the R output is higher than the output $V_2$ from the generator 50.

Referring again to FIG. 7, a register 25 latches the output from the level comparator 24. More specifically, the register 25 resets its output upon reception of a film end detection signal, which goes to H level when the film scanning starts and end switch 109 is turned on, i.e., when the unexposed portion of the film near the perforations is scanned, and at the same time, latches the output from the comparator 24. On the other hand, when the film end detection signal is at L level, i.e. when end switch 109 is turned off, the register 25 directly generates the output from the comparator 24 latched therein. A selector 26 then selects the accumulation time data in the gain setting block 23 to transfer the selected data to the accumulation time block 22 in accordance with the output from the register 25.

More specifically, when the output from the register 25 is reset, the selector 26 selects the accumulation time data, which is set to scan the unexposed portion of the film near the perforations, and transfers the selected data to the block 22. Similarly, when the register 25 produces the output corresponding to the type of film discriminated by the level comparator 24, the selector 26 also transfers the accumulation time data corresponding thereto to the block 22. The accumulation time data of the block 23 is set such that if the discrimination result of the comparator 24 represents a negative color film, the gain of B is increased (i.e., the accumulation time of the B sensor is increased), and if represents a positive color film, the gains are all decreased (i.e., accumulation times of the R, G, and B sensors are (decreased) to reliably reproduce light colors. If it is discriminated in accordance with the output produced by the comparator 24 and latched in the register 25 that the scanned film is a negative color film, level inverters 28 subtract the outputs from the sensor 6 from predetermined values to invert them, thus converting a negative image to a positive image. If it is discriminated that the scanned film is a positive color film, the inverters 28 output the outputs from the sensor 6 without inverting them.

Figure 9:
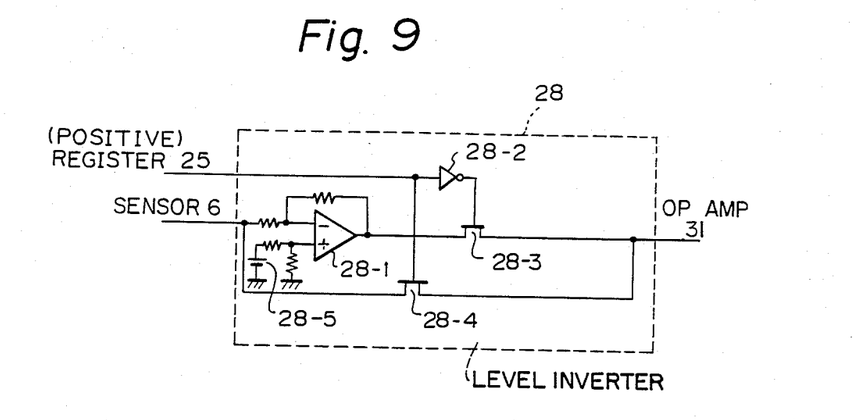
FIG. 9 is a detailed circuit diagram of level inverter 28 shown in FIG. 7.

FIG. 9 shows an arrangement of each level inverter 28, which comprises an operational amplifier 28-1 for subtracting the output from the sensor 6 from a predetermined value set by a voltage source 28-5, an inverter 28-2, and analog switches 28-3 and 28-4.

Referring again to FIG. 7, the level comparator 24 further includes a bias setting block 29. The scanner of this embodiment shown in FIGS. 1A (or 1B) separates a light beam emitted from the light source 1 by the color separation filter 3, and detects an amount of separated light which is transmitted through the film and reaches the sensor 6. Therefore, data obtained by scanning is influenced by the light transmittance of the film base. Since the light transmittance of the film base varies widely in accordance with the type of film, the light transmittance of the film base must be compensated for in order to obtain proper data. For this purpose, compensation data is prestored in the bias setting block 29. A selector 30 selects bias levels set in the block 29 in accordance with the discrimination result of the type of film latched in the register 25. Operational amplifiers 31 subtract the bias levels selected by the selector 30 from the outputs from the corresponding level inverters 28.

A case will be described wherein a positive color film as a color original is scanned with the scanner of this embodiment with the above arrangement.

As previously described, the unexposed portion of the developed positive color film transmits almost no light in the visible region (it looks black), as shown in FIG. 4. Therefore, when film scanning by the drive system of the film holder 4 shown in FIG. 1 is started, the switch 109 is turned on, the film end detection signal goes to H level, and the signal is accumulated in accordance with the accumulation time for scanning the unexposed portion of the film, which is selected by the selector 26. In this case, however, since all the R, G, and B outputs from the sensor 6 are below the predetermined value, the outputs from the comparators 45 to 47 are at H level, and the output from the AND gate 48 is at H level. Therefore, the register 25 latches the signal indicating that the scanned film is a positive color film, and the selector 26 transfers the accumulation time data for the positive color film to the block 22. Thus, the accumulation time of the sensor 6 is controlled so that the outputs from the sensor 6 are optimal irrespective of the type of film. Since the scanned film is a positive color film, the level inverters 28 enable the analog switches 28-4 (FIG. 9) upon reception of the H level signal from the register 25, indicating that the film is a positive color film, and thus output the signals from the sensor 6 without inversion. Furthermore, the operational amplifiers 31 subtract the bias levels, which are set in the block 29 and are selected by the selector 30 to correspond with the positive color film, from the outputs from the inverters 28 so as to compensate for the spectral transmittance of the film base, and output the differences as outputs Rout, Gout, and Bout.

When another type of film is used, the same operation as above is performed. However, when it is discriminated that the film used is a negative color film, the inverters 28 turn on the analog switches 28-3 to invert the outputs from the sensor 6. The operational amplifiers 31 subtract the corresponding bias levels set in the block 29 and selected by the selector 30 from the outputs from the inverters 28, so as to compensate for the influence of the spectral transmittance inherent in the type of film, thus producing outputs Rout, Gout, and Bout.

Figure 10:
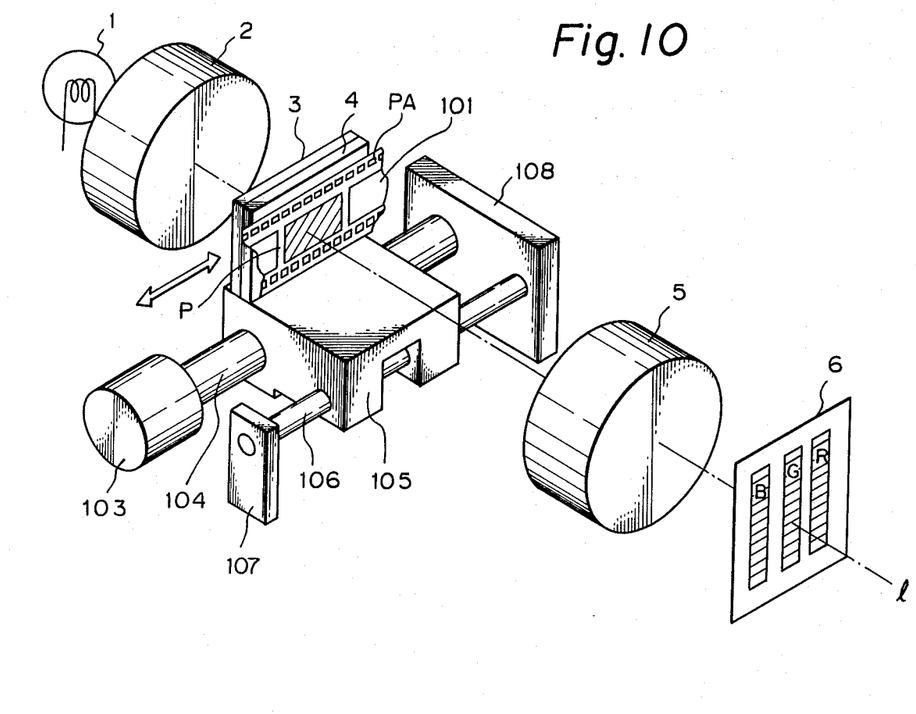
FIG. 10 is a perspective view of another embodiment of the present invention.

In this embodiment, when the film 101 is placed on the film holder 4 and the end switch 109 is turned on, the unexposed portion P of the film 101 is scanned by the sensor 6. However, the type of film can be discriminated based on data from the unexposed portion P (particularly, a portion PA near the perforations) of the film 101, which is placed on the film holder 4 and is scanned by the sensor 6 without providing the end switch 109, as shown in FIG. 10 and described below.

In this case, the data from the sensor 6 corresponding to a position on which the transmitting light is incident through the unexposed portion of the film need only be input to the level comparator 24 shown in FIG. 1A.

The present invention can also be used in an application for reading images on monochrome films or duplicating highly transparent document originals.

Figure 11:
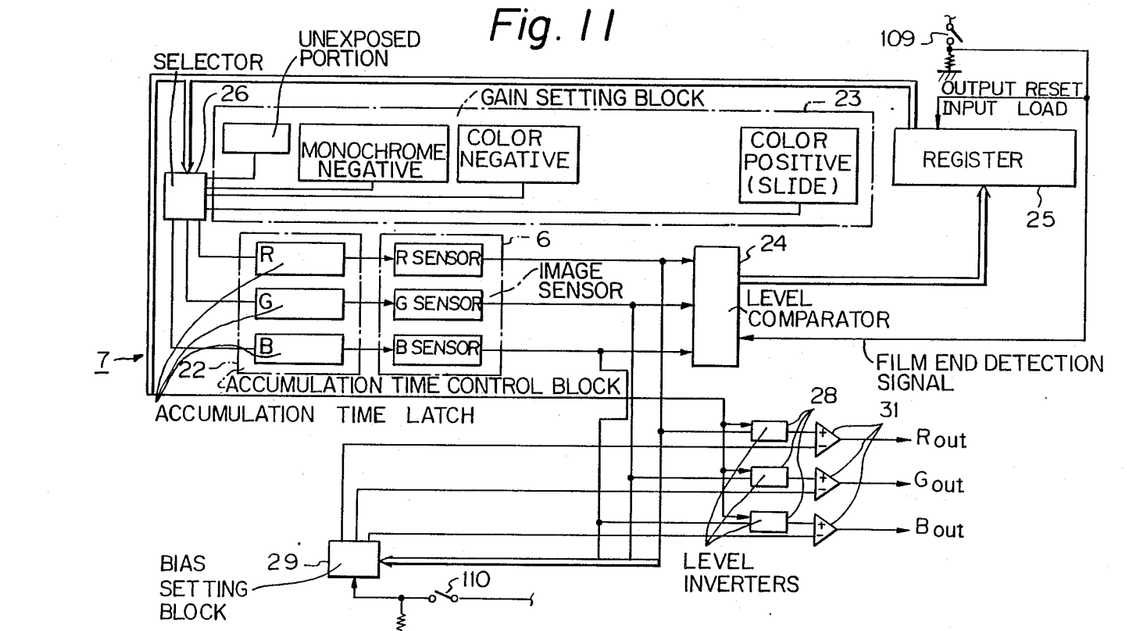
FIG. 11 is a circuit diagram of block 7 according to still another embodiment.
Figure 12:
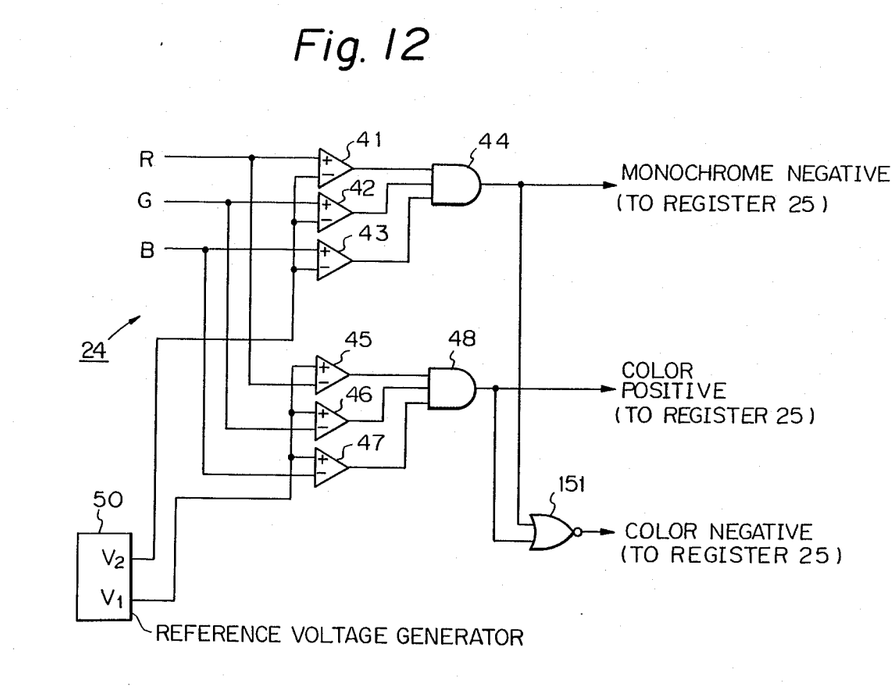
FIG. 12 is a circuit diagram of the comparator according to still another embodiment.

FIGS. 11 and 12 show another embodiment of the present invention, in which the same reference numerals denote the same parts as in FIGS. 7 and 8, respectively.

Referring to FIG. 11, the scanner of the previous embodiment, shown in FIGS. 1A (or 1B), separates the light beam emitted from the light source 1 by the color separation filter 3, and detects an amount of separated light which is transmitted through the film and reaches the sensor 6. Therefore, data obtained by scanning is influenced by the light transmittance of the film base. Since the light transmittance of a film base varies widely in accordance with the type of film, the light transmittance of the film base actually obtained in the preset accumulation time must be compenscompensated for by the R, G, and B outputs from the sensor 6 in order to obtain proper data.

With reference to FIG. 12, level comparator 24 will be explained.

In FIG. 12, the reference numerals 41 to 43 and 45 to 47 denote comparators, respectively, 44 and 48 denote AND gates, and 50 denotes a reference voltage generator circuit for generating a voltage $V_2$ ($V_2 > V_1$) for discrimination of a positive film.

In the level comparator 24, if each of the outputs of R, G and B sensed by the sensor 6 (FIG. 1) is greater than the output $V_2$ from the generator circuit 50, an output of H level is produced from the AND gate 44 to identify a film document as a negative monochrome film. If each of the outputs of R, G and B is less than the output $V_1$ of the generator circuit 50, an output of H level is produced from the AND gate 48 to identify a film document as a positive color film. If the film document is neither a negative monochrome film nor a positive color film, it is identified as a negative color film.

In the embodiment shown in FIGS. 11 and 12, R, G, and B outputs from a sensor 6 are held in a bias setting block 29 when a bias setting signal (i.e., a signal supplied from an end switch 110 to the bias setting block 29) goes from H level to L level when the end switch 110 is turned off. Operational amplifiers 31 subtract the bias levels held in the block 29 from the outputs from the corresponding level inverters 28.

A case will be described wherein a positive color film as a color original is scanned by the scanner of this embodiment with the above arrangement.

An unexposed portion of a developed positive color film transmits almost no light in the visible range (it looks black), as shown in FIG. 4. Therefore, when film scanning by a drive system of a film holder 4 as shown in FIG. 1 is started, a switch 109 is turned on, a film end detection signal goes to H level, and the signal is accumulated in accordance with an accumulation time for scanning the unexposed portion of the film, which is selected by a selector 26. In this case, however, since all the R, G, and B outputs from the sensor 6 are below a predetermined value, the outputs from comparators 45 to 47 are at H level, and the output from an AND gate 48 is at H level. Therefore, a register 25 latches the signal indicating that the scanned film is a positive color film, and the selector 26 transfers the accumulation time data for a positive color film to a block 22. Thus, the accumulation time of the sensor 6 is controlled so that the outputs from the sensor 6 are optimal irrespective of the type of film. Thereafter, when the film scanning operation advances, the switch 110 is turned off and the bias setting signal goes from H level to L level, the R, G, and B outputs from the sensor 6 are held in the block 29 as the bias levels. More specifically, the outputs from the sensor 6, which are accumulated in the accumulation time at a position (set for the unexposed portion of the film) at which the switch 110 is turned off, are held again in the block 29. Since the scanned film is a positive color film, the level inverters 28 enable analog switches 28-4 (FIG. 9) upon reception of the H level signal from the register 25 indicating that the film is a positive color film, thus outputting the signals from the sensor 6 without inversion. Furthermore, the operational amplifiers 31 subtract the bias levels, which are held in the block 29, from the outputs from the inverters 28 so as to compensate for the spectral transmittance of the film base, and output the differences as outputs Rout, Gout, and Bout.

When another type of film is used, the same operation as above is performed. However, when it is discriminated that the film used is a negative color film, the inverters 28 turn on analog switches 28-3 to invert the outputs from the sensor 6. The operational amplifiers 31 subtract the corresponding bias levels held in the block 29 from the outputs from the inverters 28, so as to compensate for the influence of the spectral transmittance inherent in the type of film, thus producing outputs Rout, Gout, and Bout.

In this embodiment, when a film 101 is placed on a film holder 4 and the end switches 109 and 110 are turned on, an unexposed portion P of the film 101 is scanned by the sensor 6. However, the type of film can be discriminated based on data from the unexposed portion P (particularly, a portion PA near the perforations) of the film 101, which is placed on the film holder 4 and is scanned by the sensor 6, without providing the end switches 109 and 110 as shown in FIG. 10.

In this case, the data from the sensor 6 corresponding to a position on which the transmitting light is incident through the unexposed portion of the film need only be input to the level comparator 24 as shown in FIG. 1A. Alternatively, bias levels corresponding to respective types of film can be stored in the bias setting block 29, and can be selected in accordance with the output from the level comparator 24 as shown in FIG. 7.

In this embodiment, in order to obtain optimal outputs from the color scanner irrespective of the type of color film, the accumulation times of the R, G, and B sensors are changed in accordance with the type of color film and bias levels are changed to compensate for the spectral transmittance of the film base. However, amplification factors for signals obtained from the sensors can be changed in accordance with the type of color film to electrically compensate for the outputs from the respective sensors without changing the accumulation times thereof. Also, instead of changing the accumulation times of the sensors, illuminance or hue of a light source can be changed to compensate for the outputs from the sensors in accordance with the type of color film.

What is claimed is:

1. A film reading apparatus comprising:
   extracting means for color-separating film document to extract a plurality of color component signals;
   discriminating means for discriminating the type of the film document by using a color component signal relating to an unexposed portion of the film document output by said extracting means; and
   control means for controlling the signal level of a color component signal relating to an exposed portion of the film document in accordance with the discrimination result obtained by said discriminating means;
   wherein said discriminating means discriminates whether the film document is a color negative film or a color positive film.

2. A film reading apparatus comprising:
   extracting means for color-separating a film document to extract a plurality of color component signals;
   discriminating means for discriminating the type of the film document by using a color component signal relating to an unexposed portion of the film document output by said extracting means; and
   control means for controlling the signal level of a color component signal relating to an exposed portion of the film document in accordance with the discrimination result obtained by said discriminating means;
   wherein said discriminating means discriminates whether the film document is a color film or a monochrome film.

3. A film reading apparatus comprising:

extracting means for color-separating a film document to extract a plurality of color component signals;

discriminating means for discriminating the type of the film document by using a color component signal relating to an unexposed portion of the film document output by said extracting means; and control means for controlling the signal level of a color component signal relating to an exposed portion of the film document in accordance with the dicrimination result obtained by said discriminating means;

wherein said control means inverts the level of the color component signal relating to the exposed portion of the film document when said discriminating means discriminates that the film document is a negative film.

4. A film reading apparatus comprising:

extracting means for color-separating a film document to extract a plurality of color component signals;

discriminating means for discriminating the type of the film document by using a color component signal relating to an unexposed portion of the film document output by said extracting means; and control means for controlling the signal level of a color component signal relating to an exposed portion of the film document in accordance with the discrimination result obtained by said discriminating means;

wherein said control means removes a bias signal, which depends upon the type of (the) film document discriminated by said discriminating means, form the color component signal relating to the exposed portion of the film document.

5. An apparatus according to claim 1, 2, 3 or 4, wherein said discriminating means discriminates the type of the film document in accordance with the signal level of each of said plurality of color component signals.

6. An apparatus according to claim 1, 2, 3 or 4, wherein said control means controls a gain for the color component signal relating to the exposed portion of the film document in accordance with the type of (the) film document discriminated by said discriminating means.

7. An apparatus according to claim 1, 2 ,3 or 4, further comprising means for detecting whether or not a color component signal output by said extracting means is a color component signal relating to the unexposed portion of the film document (or not).

8. An apparatus according to claim 1, 2, 3 or 4, wherein the plurality of color component signals are R, G and B color component signals.

9. An apparatus according to claim 2 or 4, wherein, when the film document is a color negative film, said discriminating means discriminates the type of the color negative film.

* * * * *